Nov. 27, 1945. T. E. BROWN 2,389,839
HEATING UNIT
Filed Jan. 25, 1944
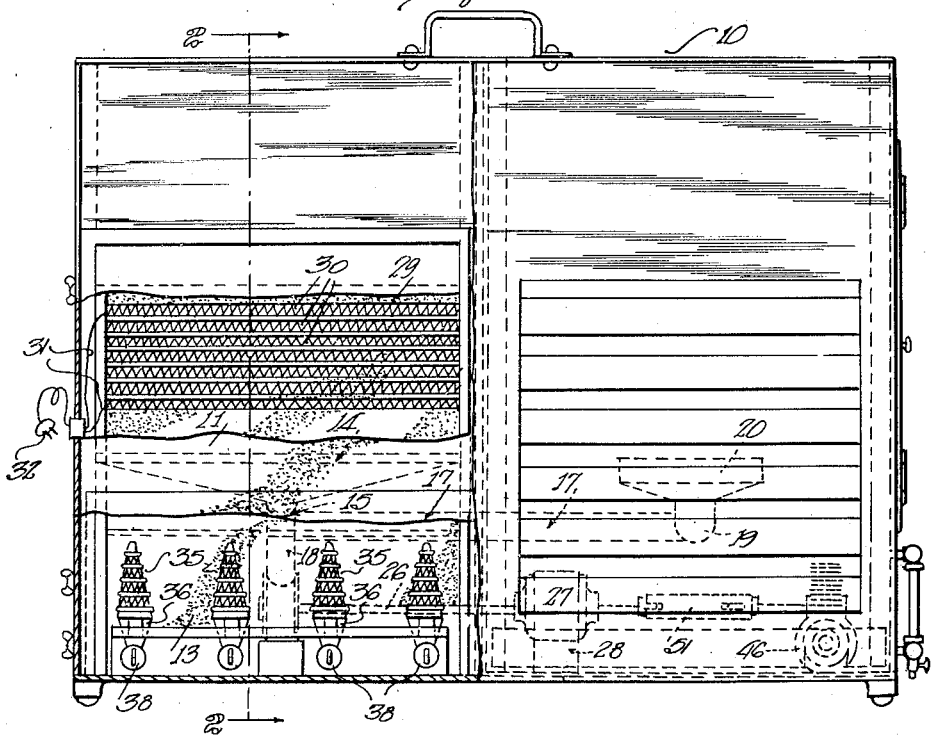
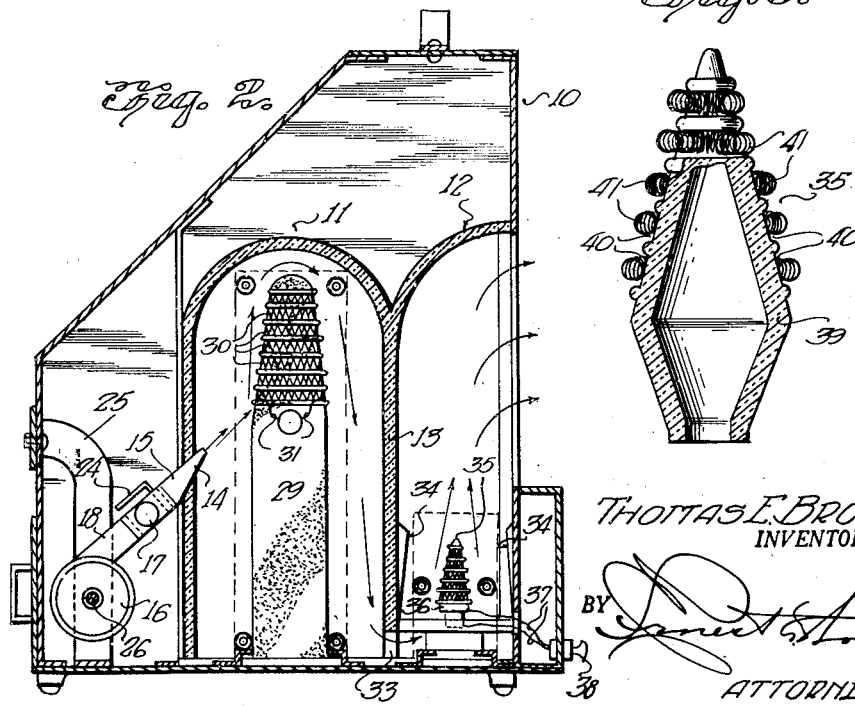
Thomas E. Brown
INVENTOR.
BY
ATTORNEY Patented Nov. 27, 1945

2,389,839

UNITED STATES PATENT OFFICE 2,389,839

HEATING UNIT

Thomas E. Brown, Shreveport, La.

Application January 25, 1944, Serial No. 519,609

6 Claims. (Cl. 219—39)

This invention relates to heating apparatus.

The principal object of the invention is to provide, in a heating unit, a heat collecting chamber composed of ceramic material and containing a radiant of analogous material, serving as a core for a plurality of electrically heated coils, the heat collecting chamber being effective to confine air, which is introduced under pressure into the chamber, within the temperature influence of the radiant, to be heated thereby prior to its discharge.

Another object of the invention is to provide a heat collecting hood of ceramic material which is preferably formed integral with the heat collecting chamber, and in which is arranged a plurality of electrically heated radiants over which the preheated air is constrained to pass as it emerges from the heat collecting chamber, the wall of the hood being effective to absorb and radiate the heat of both the rearwardly and forwardly disposed radiants, which will be referred to respectively as the major and minor radiants.

With the foregoing objects as paramount, the invention has further reference to certain features of accomplishment which will become apparent as the description proceeds, taken in connection with the accompanying drawing wherein:

Figure 1 is a front elevational view of a cabinet showing portions broken away to illustrate the major and minor radiants of the heating unit.

Figure 2 is a transverse sectional view taken on line 2—2 of Figure 1.

Figure 3 is a detail view, partly broken away, of one of the minor radiants.

Continuing with a more detailed description of the drawing, reference is primarily made to Figures 1 to 3 inclusive which illustrates the heating unit of the invention and in which numeral 10 denotes a cabinet or housing especially designed to accommodate both the heating unit and a cooling unit which will be subsequently described.

Mounted in one end of the cabinet 10 is a molded ceramic body defining a heat collecting chamber 11, having an arcuate dome, as shown in Figure 2, and a heat collecting hood 12, the rear wall 13 of which serves as a radiating surface for the heating elements to be described presently.

The rear wall of the chamber 11 has an elongated aperture therein which receives a conformably shaped nozzle 14 of a blower pipe 15.

A single blower 16 serves as the medium by which air under pressure is forced through the heating unit as well as the cooling unit, to be later described. In Figure 6, the blower arrangement is shown as consisting of the manifold conduit 17, communicating with which is a pipe 18, connected to the exhaust of the blower 16. The pipe 15 connects the manifold 17 with the nozzle 14 of the heating unit while a similar pipe 19 connects manifold 17 with a nozzle 20, the latter being directed into the cooling unit.

In order that the nozzles 14 and 20 may be alternately opened and closed, a valve is provided in the manifold 17 and consists of a clapper 21, pivotally mounted in a housing 22 by means of a pin 23. A handle 24 is operated to move the clapper 21 to close the pipe 15 to the heating unit, as shown in Figure 6, or to close the passage through the manifold 17 to pipe 19, as shown in broken lines in this figure, which serves the cooling unit. Air which is drawn into the blower through the intake pipe 25 (Figure 2) may be thus directed into one or the other of the units.

The blower 16 is driven by a shaft 26, the latter, in turn, being turned by a motor 27, mounted on a support 28 on the floor of the housing 10.

This motor also operates the elements of the cooling unit in a manner to be explained presently.

Returning to the heat collecting elements of the heating unit, it will be observed that the chamber 11 contains a major radiant 29 of molded, ceramic material, the upper portion thereof being formed with a multiplicity of horizontal and relatively parallel grooves adapted to receive heating coils 30, current to which is supplied through wires 31 and service connections 32 (Figure 1).

The dome of the chamber 11 confines the air discharged through the elongated nozzle 14 in close proximity to the heating element, constraining it to travel over the latter and downwardly along the front wall of the radiant 29, thence outward into the hood 12 through an opening 33 (Figure 2) in the bottom of the wall 13. Baffles 34 confine the air as it rises upwardly in the hood 12, over the minor radiants 35, when the temperature of the air is further increased just prior to its passage out of the cabinet as shown by the arrows in Figure 2.

The minor radiants 35 are replaceably and interchangeably mounted in suitable sockets 36 arranged in spaced relationship forwardly of the radiating wall 13 and receive current through wires 37 (Figure 2). The radiants are individually controlled by switches 38 arranged in front of the cabinet 10. In Figure 3 is shown the construction of one form of minor radiant which consists of a coniform body 39 of ceramic material, molded to define grooves 40 for receiving coils 41, to which current is supplied, as described.

Manifestly, the construction shown and described is capable of some modification and such changes as may be found necessary or desirable, as fall within the scope and meaning of the appended claims, may be made without departing from the spirit and intent of the invention.

What is claimed is:

1. In a machine for heating air, a cabinet having a rearmost and a foremost compartment, an elongated ceramic body of inverted U-shape in transverse section, defining a heat collecting chamber and an integral heat collecting hood originating at the top of one wall of said chamber and curved outwardly into said foremost compartment, an elongated opening at the base of the partitioning wall below said hood to bring the latter into communication with said cabinet, a major electrical radiant in said chamber, a plurality of independently controlled electrical radiants in said hood, means for forcing circulation of air through said chamber and hood whereby the same will be constrained by the walls of said chamber and hood to travel in close proximity to said radiants.

2. An air heater including a cabinet longitudinally separated to define parallel front and rear compartments, parallel ceramic walls in said front compartment joined at their tops by a dome of the same material to form a chamber, a hood curved outwardly from the foremost wall to embrace an opening in the front of said cabinet, a ceramic body in said chamber having a tapered and fluted upper portion, heating coils lying in the flutes of said body, a plurality of coniform ceramic bodies below said hood having heating coils thereon, means effecting communication between said chamber and said latter heating coils, and means in said rear compartment for directing air under pressure into said chamber, over said ceramic body, across said coniform bodies and through the front of said cabinet.

3. An air heater including a cabinet having front and rear compartments, a ceramic-walled chamber disposed longitudinally in said front compartment, closed except for an elongated opening at the base of the front wall thereof, a heat collecting hood curved arcuately towards an opening in the front of said cabinet, a major electrical radiant in said closed chamber, a plurality of minor radiants below said hood and means in said rear compartment for directing air under pressure upwardly into said chamber, over said major radiant, through said elongated opening and over said minor radiants.

4. In a heater, a cabinet, a ceramic chamber therein of inverted U-shape in transverse section, closed except for an opening in its front wall and having an integral hood curved arcuately towards an opening in the front of said cabinet, a ceramic body having a tapered and fluted upper portion in said chamber, electrical heating coils in the flutes thereof, a plurality of minor and coniform bodies below said hood, each having a heating coil thereon and means rearwardly of said chamber for directing air under pressure into said chamber for discharge through the wall opening thereof and over said coniform bodies in its passage from said cabinet.

5. A heater of the character described including a cabinet, a chamber therein having walls of ceramic and of inverted U-shape in transverse section, the foremost wall having an elongated opening at the base thereof, a hood of analogous material connecting the top of said chamber with the front wall of said cabinet and overlying an opening in the front of said cabinet, major and minor electrical radiants in said hood respectively and means rearwardly of said chamber for propelling air over said radiants and through the front of said cabinet.

6. A heater as described in claim 5, further defined in that the space in the cabinet occupied by the minor electrical radiants is provided with confronting baffles, converging towards their upper edges to confine air rising over the radiants prior to its passage from said cabinet.

THOMAS E. BROWN.